LOW MOLECULAR WEIGHT VULCANIZABLE POLYMERS

Carl L. Sandberg and Joan M. Mullins, St. Paul, Minn., assignors to Minnesota Mining and Manufacturing Company, St. Paul, Minn., a corporation of Delaware
No Drawing. Filed Mar. 2, 1959, Ser. No. 796,275
9 Claims. (Cl. 260—80.5)

This invention relates to low molecular weight vulcanizable polymers containing fluorine. In one aspect, this invention relates to highly fluorinated liquid-to-waxy polymers which may be vulcanized or cross-linked to form solid, tough elastomeric or rubbery products. In another aspect, this invention relates to a process for applying coatings or films to surfaces in a novel and unique manner. In still another aspect, this invention relates to new and novel polymers containing fluorine.

Highly fluorinated polymers have been known and are commercially available for use in high temperature and corrosive atmospheres. One of the primary uses of such polymers is as surface coatings and as gaskets in which the surrounding environment is highly corrosive or subject to high temperatures, or both. Such polymers withstand these conditions very well. For example, such polymers have frequently been used to coat the insides of metal vessels or tanks which are used for storage of corrosive chemicals, such as nitric acid. One of the difficulties encountered with these polymers has been their application to such surfaces and their fabrication into various preformed objects and articles, such as O-rings. The stability of the polymers themselves inherently makes their application to surfaces especially difficult. In addition, their molding and preforming is difficult because their molding temperatures are very high and close to their decomposition temperatures. It is, therefore, much to be desired to provide a new polymer and a new method for applying such polymer to surfaces and for preforming such polymer.

An object of this invention is to provide a new polymer containing fluorine.

Another object of this invention is to provide a low molecular weight polymer which can be utilized under moderate conditions to coat surfaces or be preformed and then treated to impart the necessary adhesion and the desired physical characteristics to the coating or the preformed article, such as permanency, toughness and rigidity.

Still another object of this invention is to provide a new cross-linking or vulcanization process.

Yet another object is to provide a new vulcanization recipe.

Another object of this invention is to provide a new technique for lining vessels or tanks with fluorine-containing polymers.

Still another object of this invention is to provide a method for preforming articles and objects from highly fluorinated polymers.

Various other objects and advantages of the present invention will become apparent to those skilled in the art from the accompanying description and disclosure.

According to this invention, perfluoropropene and vinylidene fluoride are copolymerized together to form a substantially saturated polymer which is of low molecular weight and varies in physical form from normally liquid to a waxy material having a melting point below about 60° C. The above comonomers may be polymerized in the presence of other monomers in small proportions, such as less than 10 mol percent, to modify the polymer in such a way as to vary the physical characteristics or provide additional sites for vulcanization and thereby produce ultimately a new and useful material. These low molecular weight polymers are placed upon surfaces or preformed under moderate pressures and temperatures and then cross-linked or vulcanized in situ to form a suitable solid adherent surface or solid article, which surface or article is substantially rigid and tough, such as a solid rubber or elastomeric material, and is not fluid at temperatures as high as 150° C. and higher.

The proportion of perfluoropropene monomer units in the ultimate copolymer will be between about 15 mol percent and about 50 mol percent depending upon the monomer mixture and physical properties desired. The proportion of vinylidene fluoride units will be between about 50 and about 85 mol percent.

The perfluoropropene-vinylidene fluoride polymer of the present invention appears to have a tendency to be crystalline. As a result, the liquid range is relatively narrow and the grease and wax has a tendency to be stiff and hard.

According to one embodiment of this invention, the above can be overcome to some extent by inclusion in the polymer of side chains which tend to prevent crystallinity. This is accomplished by polymerizing vinylidene fluoride and perfluoropropene in the presence of an alpha-beta unsaturated carboxylic acid, such as acrylic acid, methacrylic acid and crotonic acid, to produce a terpolymer. The acid radicals in the polymer also serve as sites for vulcanization or cross-linking. Only a relatively small proportion of the carboxylic acid unit in the polymer is necessary, usually less than 10 mol percent and generally in the range of 0.1 to 2 mol percent, based on the total monomer unit content of the product. The total upper limit of the other monomers in the system will be decreased corresponding to the amount of third component included.

The saturated polymer of the present invention is of low molecular weight of less than about 50,000 and is in the physical form of a normally liquid, grease or wax having a melting point below about 60° C. The preferred molecular weight range is from about 2,000 to about 10,000.

The preferred polymers of this invention have the general formula:

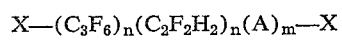

in which $n$ is 10 to 100 and may be the same or different number, $m$ is 0 to 5, A is a $\gamma$-B unsaturated carboxylic acid monomer unit, preferably a monocarboxylic acid unit having not more than six carbon atoms, and X may be a halogen, halogenated n-alkane radical having not more than three carbon atoms, a mercaptyl radical having not more than twenty carbon atoms, or hydrogen. Preferably, the halogen is selected from the group consisting of chlorine and bromine. The fluorinated monomer units in the above formula are present in a mol ratio as previously defined. The monomer units in the polymer may appear in alternating positions or in random positions and in head-to-head linkage or head-to-tail linkage. For purposes of illustration, the perfluoropropene and the unsaturated carboxylic acid appear with side groups as follows in the polymer:

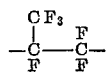

and

The polymer of this invention is capable of being vulcanized or cross-linked with vulcanizing agents to form solid elastomeric and plastic materials. The vulcanized product is usually rubber-like having considerable firmness and body. The vulcanized material is particularly useful for coatings and gaskets and other sealant applications. The polymer can be vulcanized in the form of a liquid, grease or wax with a dimercaptan, an amine, or an organic peroxide, or mixtures thereof, to form a solid elastomeric or rubbery compound. The vulcanization with the above vulcanizing agents is effected at moderate temperatures from about room temperature to about 150° C., preferably at a temperature below about 50° C. The vulcanization may take from several minutes to as long as several days.

A useful group of amines which may be used for the vulcanizing agents include the monoamines and diamines. Preferred among such class of vulcanizing agents are propylamine, tri-n-amylamine, ethylene diamine, hexamethylene diamine, and naphthalene diamine. Of the organic peroxides useful as vulcanizing agents, the preferred include benzoyl peroxide, ditertiary butyl peroxide, dilauryl peroxide, cyclohexanone peroxide, tertiary butyl hydroperoxide and disuccinic acid peroxide. The dimercaptans useful as vulcanizing agents include hexamethylene dithiol, ethylene dithiol, and tetramethylene dithiol.

It is often desirable to include in the vulcanization recipe an accelerator, such as a basic metal oxide. However, it is not necessary to use the basic metal oxides in the vulcanization recipe. Among the preferred basic metal oxides to be used as accelerators in combination with the vulcanizing agent include zinc oxide, lead oxide, magnesium oxide, and calcium oxide. Various fillers, such as carbon black and titanium dioxide, may also be used in the vulcanization recipe without departing from the scope of this invention.

In the usual vulcanization procedure, the vulcanization recipe is admixed with the polymer to be vulcanized just prior to placing the polymer upon the surface or in the configuration and the admixture let stand at a moderate temperature until vulcanization sets in. This is particularly a desirable technique to use when the polymer is liquid or a grease. In the case of greases, some heating of the polymer may be necessary in order to permit the polymer to flow onto the surface or in the contour of the configuration. In the case of waxes and also with the greases, a solvent may be used so that the polymer may be placed upon the surface or in the desired configuration in a fluid condition. Just prior to applying the polymer solution, the vulcanization recipe is added. The vulcanization recipe may also be added to the solution after application. Suitable solvents include the organic ketones, esters and ethers. For example, suitable ketones are diisobutyl ketone or methylethyl ketone. Suitable esters are methyl acetate and ethyl acetate, and a suitable cyclic ether is tetrahydrofuran. Known hydrocarbon diluents may also be used with above solvents, if desired, such as xylene and benzene. Mixtures of any of the above compounds have been found particularly suitable as solvents.

The polymer of the present invention is produced by polymerizing a mixture of the perfluoropropene and vinylidene fluoride in suitable proportions corresponding substantially or nearly to the proportions in the ultimate polymer at a temperature of about 50° to about 200° C., usually at a sufficiently high pressure at the temperature of polymerization to maintain the reactants in the liquid phase. The temperature of polymerization will depend to some extent upon the particular promoter and chain transfer agent used in the polymerization and the desired molecular weight of the product to be obtained. A residence time between about ten minutes and about 100 hours is adequate for effecting the polymerization with good conversions. Excess pressure over that necessary to obtain the liquid phase may also be used, such as pressure as high as 15,000 to 30,000 pounds per square inch gauge without departing from the scope of this invention.

The polymerization is effected in the presence of a free radical-forming polymerization promoter and a chain transfer agent. Suitable promoters for the polymerization include both the inorganic and organic peroxides and free oxygen.

The polymerization system may be aqueous or non-aqueous. Of the aqueous systems, the emulsion polymerization systems are preferred since such systems lead to good yields of low molecular weight polymers of hexafluoropropene and vinylidene fluoride having the desirable properties herein described. Activators (reducing agents), accelerators and buffers also may be included as ingredients of the aqueous systems, as desired, without departing from the scope of this invention.

The different types of aqueous systems may be conveniently differentiated on the basis of the promoter employed to initiate the copolymerization reaction. For example, one type of aqueous system is that in which an organic peroxide, which is preferably a water soluble peroxide, is employed as the initiator. Exemplary of the organic peroxides or oxidants which are particularly preferred as the initiators in an aqueous system are cumene hydroperoxide, diisopropyl benzene hydroperoxide, tertiary butyl hydroperoxide, and tertiary butyl perbenzoate. Benzoyl peroxide and chloroacetyl peroxide are good promoters for non-aqueous systems.

A second type of suitable aqueous polymerization system is that in which the promoter or initiator is one of the group of water soluble inorganic peroxides such as the perborates, persulfates, perphosphates, percarbonates, barium peroxide, and zinc peroxide. Particularly effective inorganic peroxides are the water soluble salts of the peracids such as the sodium, potassium, calcium, barium and ammonium salts of the persulfuric and perphosphoric acids such as potassium persulfate and sodium perphosphate.

Emulsifiers may be employed in the aqueous systems and comprise the inorganic derivatives derived from aliphatic carboxylic acids including both the unsubstituted hydrocarbon and halogen-substituted aliphatic carboxylic acids, such as perfluorooctanoic acid. The non-halogenated hydrocarbon type of emulsifiers or soaps comprise the metal salt derivatives such as the potassium and sodium salts derived from aliphatic hydrocarbon acids having an optimum chain length between about 14 and about 20 carbon atoms per molecule and are typically exemplified by potassium stearate, sodium oleate and potassium palmitate. and any mixture thereof.

The weight ratio of promoter to total monomers charged is between about 1:10 to about 1:500 and is generally between about 1:15 to 1:100.

Suitable chain transfer agents which are used in addition to the promoter include normal acyclic halogenated hydrocarbons, such as chloroform, carbon tetrachloride, trichlorotrifluoroethane, 1,1,2-tetrachloroethane, and trichloroethylene, and the acyclic mercaptans, such as dodecyl mercaptan, decyl mercaptan, hexadecyl mercaptan and butyl mercaptan. The weight ratio of chain transfer agent to total monomers charged is usually between about 1:20 to about 1:300, and as little as 1:1000, particularly with the mercaptans. The transfer agents dissociate and form the terminal groups on the polymer chain; thus, with carbon tetrachloride the terminal groups are Cl— and the alkyl radical, $CCl_3$—. With the mercaptans, the terminal groups are the mercaptyl radical and hydrogen.

The polymerization is effected in a continuous or batchwise manner in suitable and conventional equipment for this purpose. The conversion of monomers is as high at 50 percent of the monomers charged and is often much higher. After the polymerization, the polymer is separated from the polymerization effluent by distillation or decantation.

According to one aspect of this invention, the low molecular weight saturated polymers are applied to surfaces and vulcanized. In the case of lining the inside of a metal vessel, such as an aluminum tank, the polymer is introduced into the bottom of the vessel as a liquid. The vulcanization agent is added either with the charge or after the charge. Vulcanization is effected at room temperature or at moderately elevated temperatures. The vessel is then changed in position such that the bottom area now corresponds to the uncoated portion of the vessel and the procedure previously outlined repeated. This is continued until the entire inside surface of the vessel is coated with a continuous and uniform coating or film of vulcanized polymer.

A suitable formulation for vulcanization in such a manner as above described is given below.

PART A

The following ingredients are milled together:

| | Parts by weight |
|---|---|
| Polymer | 100 |
| Carbon black | 30 |
| MgO | 10 |
| Diallylamine | 1 |

This mixture is then heated to 300° F. in an autoclave. The autoclave is used to prevent flashing of diallylamine. The heated mixture is then removed, refined on the mill if in solid form, then dissolved in methylethyl ketone as a solvent. The amount of solvent necessary is dictated by the mobility of the mixture and that amount required to place the mixture in liquid phase. In the event that the polymer is liquid, no dissolving or milling is necessary.

PART B

| | Parts by weight |
|---|---|
| Hexamethylene dithiol | 1.5 |
| Tri-n-amylamine | 5 |

The above Part B is mixed with the material of Part A from the autoclave, and the resultant mixture which is in liquid form is poured or cast into its final location or configuration. Upon standing twenty-four hours at room temperature, the final cure is effected. It may be desirable to warm the mixture during vulcanization to accelerate the vulcanization.

The following examples are offered as a better understanding of the present invention and are not to be considered unnecessarily limiting thereto. In the following Examples the viscosity $<n>$ is equal to $$\frac{\ln \frac{n \text{ solution}}{n \text{ solvent}}}{C}$$

where C is concentration of polymer in grams per 100 ml. of solution, and $n$ solution and $n$ solvent are viscosities in consistent units.

*Example I*

Perfluoropropene, vinylidene fluoride and acrylic acid were polymerized to produce a liquid polymer as follows. The recipe for the polymerization included 100 parts of total monomers, 200 parts of water, 1 part of potassium persulfate, 4 parts of the ammonium salt of perfluorooctanoic acid, 1.6 parts of acrylic acid, and 0.5 part of dodecyl mercaptan. The monomers were in a 70:30 mol ratio of vinylidene fluoride to perfluoropropene in the above mixture except for the acrylic acid. Polymerization was effected in a polymerization tube at a temperature of 60° C. for a time equivalent to 100 hours. The tube was shaken during the polymerization. After polymerization, the tube was emptied and a liquid polymer was obtained having an average molecular weight of about 3,000 with a substantial conversion.

*Example II*

Vinylidene fluoride, perfluoropropene and acrylic acid were polymerized together at a temperature of about 80° C. for sixteen hours in a mol ratio corresponding to about 70:30:3, respectively. The polymerization recipe included the following:

6.4 grams of vinylidene fluoride
15 grams of perfluoropropene
0.422 gram of acrylic acid
42.8 grams of water
0.64 gram of potassium persulfate
0.85 gram of the ammonium salt of perfluorooctanoic acid
0.012 gram of carbon tetrachloride The polymer obtained was a low molecular weight terpolymer having a viscosity $<n>$ of 0.29 corresponding to an average molecular weight of about 10,000. The polymer was readily dissolved in acetone. The latex from the polymerization mixture was freeze coagulated, the coagulated polymer was dissolved in acetone and the solution of polymer was precipitated with water. The polymer could be made fluid at temperatures between 50° and 60° C.

Such a polymer is then vulcanized to produce a rigid elastomeric material by admixing therewith 10 parts of triethylene tetraamine per 100 parts of polymer and heating at an elevated temperature about 130° C. for four hours. The resulting vulcanized or cured polymer has the following typical properties:

| | Percent |
|---|---|
| Weight loss, 119 hours at 400° F | 1.1 |
| Weight loss, 117 hours at 500° F | 5 |
| Percent weight gain in 70/30 fuel, 72 hours at 180° F | 1.6 |

*Example III*

Perfluoropropene and vinylidene fluoride were copolymerized as follows to produce a low molecular weight elastomeric polymer. The following ingredients were charged to a polymerization tube and polymerized at about 60° C. for eighteen hours:

10 grams of vinylidene fluoride
10 grams of perfluoropropene
0.8 gram of perfluorooctanoic acid
0.4 gram of potassium persulfate
0.76 gram of carbon tetrachloride
40 grams of water The mol ratio of vinylidene fluoride to perfluoropropene in the above charge corresponded to about 70:30.

There was obtained a 40 percent conversion of a solid material of a waxy nature which was readily dissolved in acetone and had a viscosity $<n>$ of 0.055 corresponding to an average molecular weight of about 6,000. The polymer was obtained from the reaction mixture by decantation and by dissolving the polymer in acetone and reprecipitating the polymer in water followed by decantation. This material could be liquefied by heating to a temperature below 50° C. and could be applied as a fluid to a surface by heating or by moderate pressure and then vulcanized to a solid elastomeric coating by an amine, such as ethylene diamine, or a peroxide, such as benzoyl peroxide.

*Example IV*

Vinylidene fluoride, perfluoropropene and acrylic acid were polymerized together at a temperature of about 60° C. for sixteen and one-half hours in a mol ratio corresponding to about 70:30:2, respectively. The polymerization recipe included the following:

1 gram of vinylidene fluoride
1 gram of perfluoropropene
0.032 gram of acrylic acid
0.10 gram of potassium persulfate
.02 gram of perfluorooctanoic acid
.06 gram of carbon tetrachloride
4 grams of water The polymer obtained was a low molecular weight terpolymer capable of being readily dissolved in acetone and having a viscosity $<n>$ of 0.049 corresponding to an average molecular weight of about 5,000. The conversion was about 75 percent. The unvulcanized material softens and strings at 40° C. and is completely fluid at 50° C. This material could be, therefore, made fluid under moderate conditions of temperature and pressure and could be vulcanized with an amine or peroxide vulcanizing agent to produce an elastomeric rigid and tough protective coating.

The present invention relates to a new and novel low molecular weight perfluoropropene-vinylidene fluoride polymer which can be applied to a surface in a fluid condition and then vulcanized to a solid material. Various modifications and alterations in the techniques and conditions for obtaining such a polymer and for vulcanizing same will become apparent to those skilled in the art without departing from the scope and teachings of the present invention.

Having described our invention, we claim:

1. A vulcanizable low molecular weight terpolymer capable of being applied in fluid form, comprising between about 15 and about 50 mol percent perfluoropropene, between about 50 and about 85 mol percent vinylidene fluoride, and between about 0.1 and about 10 mol percent alpha-beta unsaturated carboxylic acid, in combined polymeric form, in which the terminal groups are selected from the members of the group consisting of chlorine, bromine, a halogenated n-alkane radical having not more than 3 carbon atoms, a mercaptyl radical having not more than 20 carbon atoms and hydrogen.

2. A vulcanizable low molecular weight terpolymer capable of being applied in fluid form, comprising between about 15 and about 50 mol percent perfluoropropene, between about 50 and about 85 mol percent vinylidene fluoride, and between about 0.1 and about 10 mol percent acrylic acid, in combined polymeric form, in which the terminal groups are selected from the members of the group consisting of chlorine, bromine, a halogenated n-alkane radical having not more than 3 carbon atoms, a mercaptyl radical having not more than 20 carbon atoms and hydrogen, and in which the molecular weight is between about 2,000 and about 10,000 and is liquid at a temperature below about 60° C.

3. A process which comprises vulcanizing a low molecular weight polymer comprising between about 15 and about 50 mol percent perfluoropropene units and between about 50 and about 85 mol percent vinylidene fluoride units and between about 0.1 and about 10 mol percent of an alpha-beta unsaturated monocarboxylic acid, in combined polymeric form, having a molecular weight between about 2,000 and about 10,000, and is liquid in its unvulcanized form at a temperature below 60° C., in a fluid condition at a temperature below about 50° C. with an amine to produce a solid elastomeric material which is not fluid at a temperature below about 150° C.

4. A process for vulcanization which comprises vulcanizing a low molecular weight polymer comprising between about 15 and about 50 mol percent perfluoropropene units and between about 50 and about 85 mol percent vinylidene fluoride units and between about 0.1 and about 2 mol percent acrylic acid, in combined polymeric form, having a molecular weight between about 2,000 and about 10,000, and is liquid in its unvulcanized form, at a temperature below 60° C., in a fluid condition at a temperature below about 50° C. to produce a solid elastomeric terpolymer.

5. A process which comprises polymerizing between about 15 and about 50 mol percent perfluoropropene, between about 50 and about 85 mol percent vinylidene fluoride, and between about 0.1 and about 10 mol percent of an alpha-beta unsaturated monocarboxylic acid, at a temperature between about 50 and about 200° C., in admixture with a chain transfer agent selected from the group consisting of acyclic mercaptans having not more than 20 carbon atoms and the acyclic chlorinated hydrocarbons having not more than 3 carbon atoms, to produce a polymer which is liquid at a temperature not higher than about 60° C.

6. The process of claim 5 in which said chain transfer agent is carbon tetrachloride.

7. The process of claim 5 in which said chain transfer agent is dodecyl mercaptan.

8. A process which comprises terpolymerizing between about 15 and about 50 mol percent perfluoropropene, between about 50 and about 85 mol percent vinylidene fluoride, and between about 0.1 and about 2 mol percent of acrylic acid, at a temperature between about 50 and about 200° C., in admixture with an acyclic mercaptan having not more than 20 carbon atoms as a chain transfer agent to produce a normally liquid vulcanizable terpolymer.

9. A solid vulvanized elastomeric material obtained by vulcanizing with a vulcanization agent selected from the group consisting of dimercaptans, amines and organic peroxides, a low molecular weight polymer comprising between about 15 and about 50 mol percent perfluoropropene, between about 50 and about 85 mol percent vinylidene fluoride, and between about 0.1 and about 10 mol percent alpha-beta unsaturated carboxylic acid, in combined polymeric form, in which the terminal groups are selected from the members of the group consisting of chlorine, bromine, a halogenated n-alkane radical having not more than 3 carbon atoms, a mercaptyl radical having not more than 20 carbon atoms and hydrogen, and which in its unvulcanized form is liquid at a temperature below about 60° C.

References Cited in the file of this patent

UNITED STATES PATENTS

| | | |
|---|---|---|
| 2,446,382 | Mochel | Aug. 3, 1948 |
| 2,793,200 | West | May 21, 1956 |
| 2,833,752 | Honn et al. | May 6, 1958 |
| 2,999,854 | Honn et al. | Sept. 12, 1961 |
| 3,023,187 | Lo | Feb. 27, 1962 |
| 3,025,183 | Yuan | Mar. 13, 1962 |
| 3,025,185 | Schmidt | Mar. 13, 1962 |